US007051579B2

(12) United States Patent
Kenney et al.

(10) Patent No.: US 7,051,579 B2
(45) Date of Patent: May 30, 2006

(54) METHOD AND APPARATUS FOR CONTINUOUSLY MONITORING INTERSTITIAL REGIONS IN GASOLINE STORAGE FACILITIES AND PIPELINES

(75) Inventors: Donald P. Kenney, McFarland, WI (US); Walt Simmons, Madison, WI (US)

(73) Assignee: Franklin Fueling Systems, Inc., Madison, WI (US)

( * ) Notice: Subject to any disclaimer, the term of this patent is extended or adjusted under 35 U.S.C. 154(b) by 0 days.

(21) Appl. No.: 10/842,894

(22) Filed: May 11, 2004

(65) Prior Publication Data

US 2005/0252277 A1  Nov. 17, 2005

(51) Int. Cl.
*G01M 3/04* (2006.01)
(52) U.S. Cl. .............................. 73/49.2; 73/40; 340/605
(58) Field of Classification Search ............... 73/40, 73/49.2; 340/605
See application file for complete search history.

(56) References Cited

U.S. PATENT DOCUMENTS

| | | | |
|---|---|---|---|
| 4,144,743 A | 3/1979 | Covington et al. | |
| 4,587,619 A | 5/1986 | Converse, III et al. | |
| 4,686,638 A | 8/1987 | Furuse | |
| 4,794,784 A | 1/1989 | Bley | |
| 4,796,676 A | 1/1989 | Hendershot et al. | |
| 4,993,256 A | 2/1991 | Fukuda | |
| 5,117,677 A | 6/1992 | Hendershot et al. | 340/605 |
| 5,168,748 A * | 12/1992 | Flora et al. | 73/49.2 |
| 5,400,646 A | 3/1995 | Krause et al. | 340/605 |
| 5,408,420 A | 4/1995 | Slocum et al. | |
| 5,461,906 A | 10/1995 | Bogle et al. | |
| 5,467,641 A | 11/1995 | Williams et al. | |
| 5,657,254 A | 8/1997 | Sierk et al. | |
| 5,883,301 A | 3/1999 | Filippi et al. | 73/40.5 R |
| 5,927,762 A * | 7/1999 | Webb | 285/123.15 |
| 6,082,182 A | 7/2000 | Fierro et al. | |
| 6,082,184 A | 7/2000 | Lehmann | |
| 6,202,477 B1 | 3/2001 | Lehmann | |
| 6,223,130 B1 | 4/2001 | Gray et al. | |
| 6,305,215 B1 | 10/2001 | Lehmann | |
| 6,439,033 B1 | 8/2002 | Lehmann | |
| 6,489,894 B1 | 12/2002 | Berg | |
| 6,629,450 B1 | 10/2003 | Lu et al. | |
| 2003/0015022 A1 | 1/2003 | Stegmann et al. | |

FOREIGN PATENT DOCUMENTS

| | | |
|---|---|---|
| DE | 42 18 890 | 12/1993 |
| JP | 2001-318022 | 11/2001 |

OTHER PUBLICATIONS

"Underground Storage of Hazardous Substances," Statutes of Chapter 6.7, California Codes, Health and Safety Codes, pp. i-iv, 1-43, Jul. 7, 2003.
International Search Report for PCT/US05/004165, dated Jun. 21, 2005.

* cited by examiner

*Primary Examiner*—Daniel S. Larkin
(74) *Attorney, Agent, or Firm*—Marshall, Gerstein & Borun LLP

(57) ABSTRACT

An underground storage system includes a primary containment unit and a secondary containment unit arranged to sealingly encompass the primary containment unit. The underground storage system further includes a leak detection system which is fluidly connected to the secondary containment system, and which is adapted to detect fluid leaks in the primary containment system and the secondary containment system.

33 Claims, 4 Drawing Sheets

METHOD AND APPARATUS FOR CONTINUOUSLY MONITORING INTERSTITIAL REGIONS IN GASOLINE STORAGE FACILITIES AND PIPELINES

TECHNICAL FIELD

This patent is generally directed to an apparatus and method for interstitial monitoring, and more particularly to a system for continuously monitoring the pressure and vacuum levels within the interstitial space of an underground storage tank system.

BACKGROUND

Current and proposed state and federal regulations require that underground storage tanks used for the storage of hazardous substances meet certain environmental safety requirements. In particular, these environmental regulations require that the underground storage systems include a primary containment unit and a secondary containment unit. Moreover, the primary and secondary containment units are required to comply with the environmental standards that require underground storage tank systems to be product tight. The term "product tight," for purposes of these environmental regulations, is generally defined as impervious to the substance that is contained to prevent seepage of the substance from the primary containment unit. Moreover, for a tank to be product tight, the tank cannot be subject to physical or chemical deterioration by the contained substance over the useful life of the tank. Further, these regulations require that owners or operators of an underground storage tank system with a single-walled component located within 1,000 feet of a public drinking water well implement a program of enhanced leak detection or monitoring.

One known method of monitoring leaks disclosed in U.S. Pat. No. 6,489,894, entitled "Leak Detection Device for Double Wall Pipeline Systems and Container Systems," uses a leak detector with a vacuum pump including a pressure-dependent switch and an alarm device to detect leaks in a double-walled pipeline or container system. The disclosed leak detector is adapted to simultaneously monitor several containers connected to a collecting main and a vacuum pump by vacuum lines. Each monitored container incorporates a vacuum connector or valve to fluidly connect a control space to the leak detector. Each vacuum line has a first liquid lock arranged at the vacuum connector to block liquid that has leaked into the vacuum lines from a leaky container from penetrating into the control spaces of the leak-free containers. A second liquid lock is arranged in the collecting main to prevent liquid from entering the vacuum pump. While this method can detect leaks within the control space of a container, it is a mechanically complex system requiring a great deal of materials and set-up time.

Other methods of monitoring secondary or interstitial spaces are well known in the art and include continuous leak detection using both pressure and brine solution monitoring techniques to determine the presence or absence of leaks between the storage system and the surrounding environment. However, to effectively calibrate all of these known methods and systems for operation, a great deal of set-up time and system knowledge is required. Specifically, to configure these monitoring systems for operation, the user must enter the volume of the secondary or interstitial space to be monitored, which requires a detailed knowledge of the layout and the configuration of the double walled piping and containers used in the underground storage system.

SUMMARY

An underground storage system includes a primary containment unit and a secondary containment unit arranged to sealingly encompass the primary containment unit. The underground storage system further includes a leak detection system that is fluidly connected to the secondary containment system, and which is adapted to detect fluid leaks in the primary containment system and the secondary containment system.

BRIEF DESCRIPTION OF THE DRAWINGS

For a more complete understanding of the disclosed device, reference should be made to the following detailed description and accompanying drawings wherein.

DETAILED DESCRIPTION

Figure 1:
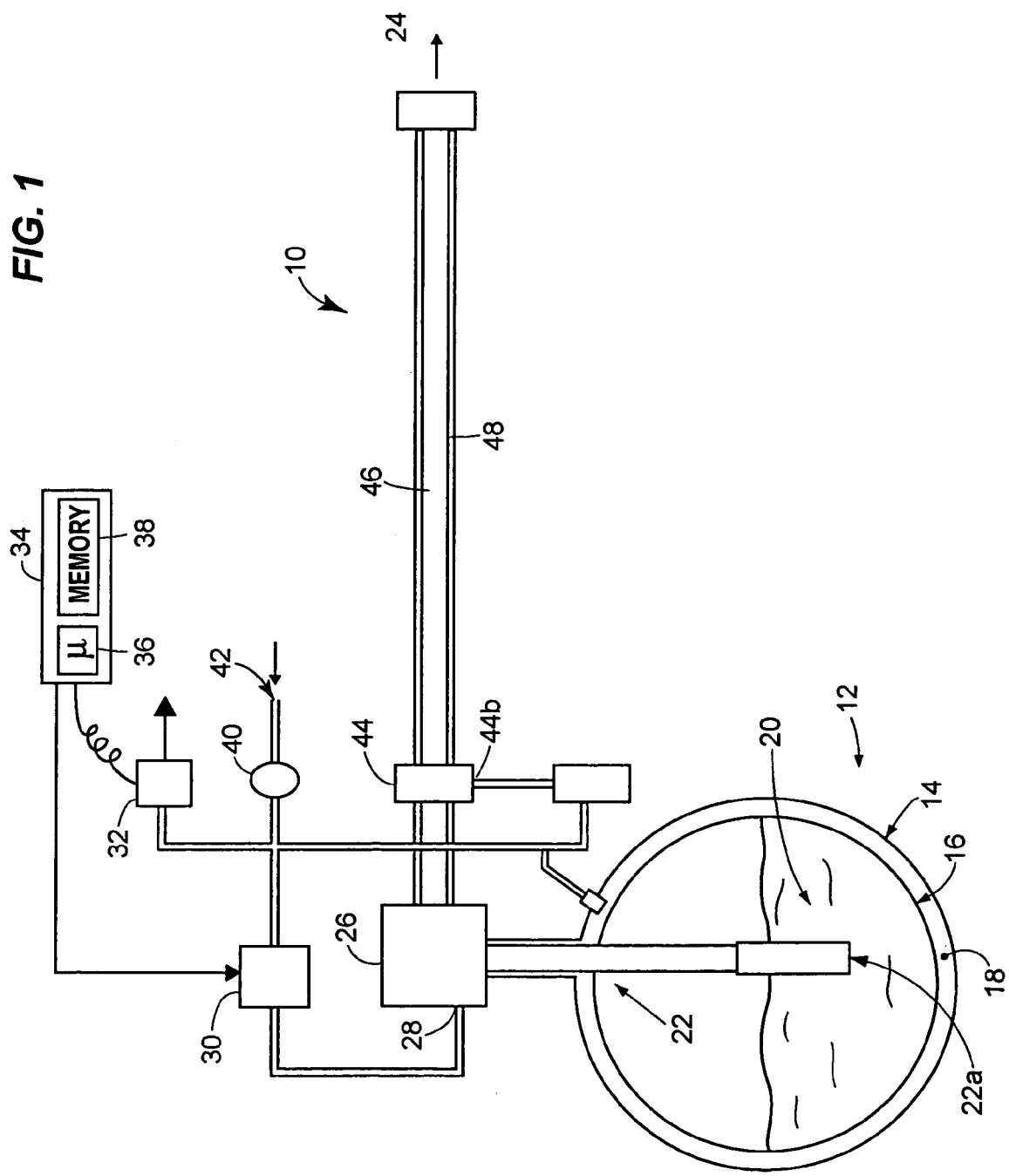
FIG. 1 illustrates the basic components of an exemplary interstitial vacuum monitoring system.

FIG. 1 illustrates an exemplary underground storage system 10 that includes an underground storage tank (UST) 12 constructed to securely contain a liquid 20 such as gasoline, diesel fuel or other hydrocarbon. The UST 12 is a double walled storage tank constructed with an outer wall 14, and an inner wall 16 separated to define an interstitial space 18. In this manner, the UST 12 is divided into a primary containment unit and a secondary containment unit to provide the underground storage system 10 with redundant leak protection.

A submersible turbine pump (STP) 22 such as, for example, the STP model number STP-75-VL2-7 manufactured by FE PETRO, INC.®, provides a means of pumping the liquid 20 to a dispenser 24. The STP 22 may fixedly or removably mount to the UST 12 to position an input nozzle 22a below the surface of the liquid 20. The input nozzle 22a, in turn, provides a fluid path for pumping the liquid 20 within the primary containment unit to the dispenser 24.

A pump manifold 26, which can be an integral component of the STP 22 or a separate component fixedly attached thereto, controls the distribution of the pumped liquid 20 to the dispenser 24. The pump manifold 26 includes a siphon port 28 adapted to fluidly connect the interstitial space 18 (e.g., secondary containment unit) to the vacuum generated by the STP 22. Thus, when the STP 22 is active (e.g., producing a vacuum) the siphon port 28 provides a vacuum path to the interstitial space 18 to evacuate the fluid contained therein. A control valve 30 can isolate the interstitial space 18 from the siphon port 28 to prevent a vacuum drop when the STP 22 is inactive and exposed to atmospheric pressure via the primary containment unit.

A vacuum sensor 32 fluidly communicates with the interstitial space 18 and the siphon port 28 to sample and measure the vacuum levels therein. The vacuum sensor 32 may be a continuous analog sensor, a discrete digital sensor, a switch based sensor, or any other device configured to sample the vacuum level within the interstitial space 18. The vacuum sensor 32 may be isolated by the control valve 30 to prevent atmospheric pressure measurements (i.e., zero vacuum measurements) when the STP 22 is inactive. However, when the STP 22 is active and generating a vacuum, the control valve 30 opens to provide a fluid connection between the vacuum sensor 32, the interstitial space 18 and the siphon port 28. In this manner, the vacuum sensor 32 samples and measures the change in the vacuum level within the interstitial space 18 generated by the STP 22.

Further, the vacuum sensor 32 can communicatively connect to a control unit 34 having a processor 36 and a memory 38. The control unit 34 and the memory 38 receive and store vacuum data, system information, alarm data, etc., from the vacuum sensor 32 or any other controlled component. Communications between the control unit 34 and, for example, the vacuum sensor 32 and the control valve 30, may be implemented using any desired communications link, such as a hardwired local area network, a wireless communications link, a direct communications link, or a point-to-point wired communication link.

The processor 36 may execute a control routine to direct the set-up and operation of the underground storage system 10. In particular, the control routine may be written in any process control programming language or computer language such as $C^{++}$, Visual $C^{++}$, Visual Basic, machine language and may be compiled (if necessary) and stored in the memory 38. Generally, the control routine insures the integrity of the underground storage system 10 by detecting unwanted leaks. In particular, the control routine may execute on the processor 36 to automatically learn the vacuum characteristics of the interstitial space 18. Further, the control routine may include additional subroutines adapted to execute on the processor 36 to continuously monitor the vacuum level within the interstitial space 18 as a function of time.

A leak orifice valve 40 fluidly connects to the control valve 30, the vacuum sensor 32, and a leak orifice 42, to provide a vacuum path between the interstitial space 18. The leak orifice valve 40 and the leak orifice 42 can define a removable assembly adapted to disconnect from the interstitial space 18 when no longer required for the set-up and operation of the underground storage system 10. The leak orifice valve 40 allows for the automatic or manual creation of a calibrated or controlled leak between the interstitial space 18 and atmospheric pressure beyond the leak orifice 42. Such a controlled leak results in a decrease in the vacuum level within the interstitial space.

The vacuum sensor 32 can, in turn, measure the decreasing vacuum level and communicate the vacuum level data to the control routine executing within the control unit 34 via the communications link. The control routine can, in turn, manipulate the vacuum level data to establish one or more vacuum characteristics of the interstitial space 18. In particular, the control routine may determine a negative vacuum level rate of change based on the decreasing vacuum level data caused by the introduction of the controlled leak into the secondary containment unit. It will be understood that other vacuum characteristics such as, for example, a positive vacuum level rate of change, or the time to total interstitial space evacuation can be additionally or alternatively established based on the vacuum level data.

The UST 12 can connect to other components of the underground storage system 10. In particular, the interstitial space 18 can fluidly connect to a secondary interstitial space 48 of a dispenser pipe 46 via a plurality of vacuum ports 44–44b. In operation, the double-walled dispenser pipe 46 can provide the fluid connection between the liquid 20 stored within UST 22 and the dispenser 24. Thus, the entire underground storage system 10, including the UST 12 and the dispenser pipe 46, is double-walled and product tight against penetrations and corrosion that may be experienced during normal operations.

Figure 2:
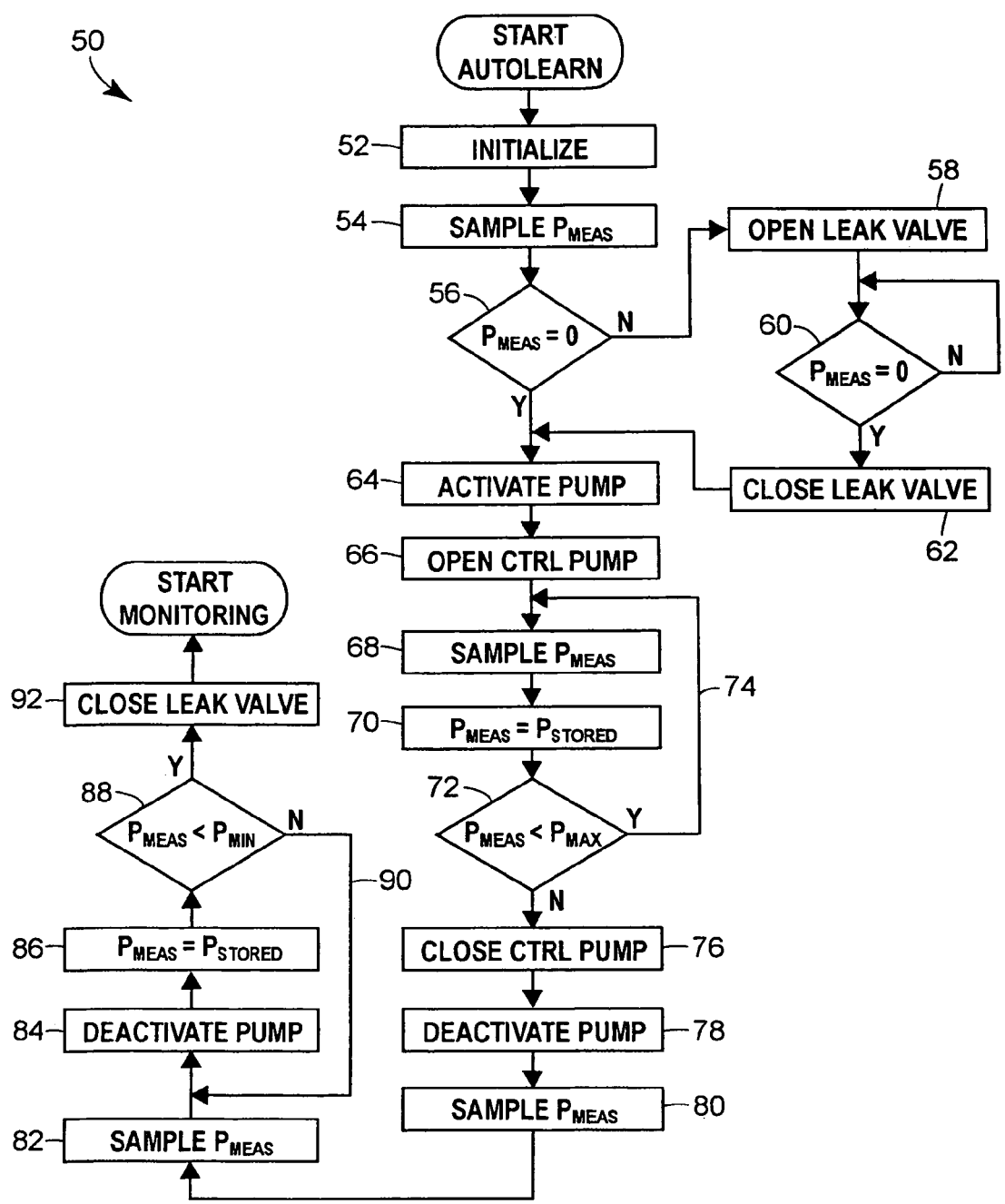
FIG. 2 illustrates a flowchart detailing the operation of an exemplary auto-learn routine.

FIG. 2 illustrates a generalized operations flowchart of an auto-calibrating or auto-learn subroutine 50 adapted to learn the vacuum characteristics of the interstitial space 18. The auto-learn subroutine 50 determines and stores the vacuum characteristics based, in part, on measured changes in the vacuum level as a function of time. The auto-learn subroutine 50 learns the vacuum characteristics without the need to determine or calculate the overall volume of the interstitial space 18, the vacuum capacity of the STP 22, the sensitivity of the vacuum sensor 32, etc. In this manner, the auto-learn routine 50 provides a fast and efficient means of calibrating and monitoring the interstitial space 18 of any known or unknown volume or complexity. It will be-understood that the auto-learn routine 50 can act as a stand alone routine independent of the control routine or other subroutines. However, the auto-learn routine 50 can integrate with the control routine to satisfy the calibration requirements of the underground storage system 10.

The auto-learn routine 50 can execute whenever a predetermined criteria has been satisfied. In particular, the auto-learn routine 50 can execute manually as part of a regularly scheduled maintenance procedure, or automatically in response to a change in the configuration of the underground storage system 10, as part of the initial set-up and configuration of the underground storage system 10, or to compensate for a change in vacuum level over time.

A block 52 loads the stored initial settings and default conditions required to execute the auto-learn routine 50 from the memory 38 (see FIG. 1). These initial settings and default conditions can include, among other things, a maximum desired vacuum level $P_{max}$, a minimum allowable vacuum level $P_{min}$, closing the control valve 30, and calibrating the vacuum sensor 32.

While the maximum desired vacuum level can be set to virtually any value, empirical testing indicates that a vacuum level of approximately 10 in. Hg (254 mm Hg), which represents an achievable vacuum level that is easily distinguishable from atmospheric pressure, may be desirable. Similarly, the minimum acceptable vacuum level may be set to, for example, 2 in. Hg (50.8 mm Hg). Typically, the minimum vacuum level $P_{min}$ provides a lower boundary or threshold to identify when the current vacuum level $P_{meas}$ within the interstitial space 18 is decreasing towards atmospheric pressure (i.e., approx 0 in. Hg or zero vacuum).

A block 54 causes the vacuum sensor 32 to sample and measure the current vacuum level $P_{meas}$ within the interstitial space 18. Typically, the vacuum sensor 32 samples the current vacuum level $P_{meas}$ at regular time intervals $\Delta t$ throughout the operation of the auto-learn routine 50. The memory 38 can store the vacuum level data representing the current vacuum level $P_{max}$ in a historical database as a stored vacuum level $P_{stored}$. The stored vacuum level $P_{stored}$ can be permanently archived in the historical database (i.e., saved in the database) or can be temporarily stored for use in calculations, analysis, etc. and subsequently erased or overwritten as new data is sampled and stored.

A block 56 compares the current vacuum level $P_{meas}$ to atmospheric pressure (i.e., zero vacuum) to establish a vacuum baseline prior to the execution of the remaining steps within the auto-learn routine 50. Upon detection of a-vacuum in the interstitial space 18, a block 58 causes the control valve 30 and the leak orifice valve 40 to open and vent the detected vacuum to the atmosphere. A block 60 causes the vacuum sensor 32 to sample the current vacuum level $P_{meas}$ until atmospheric pressure is detected. When the vacuum sensor 32 detects atmospheric pressure, a block 62 closes the control valve 30 and the leak orifice valve 40 to seal and isolate the interstitial space 18 in preparation for the execution of an evacuation procedure portion of the auto-learn routine 50.

Figure 3:
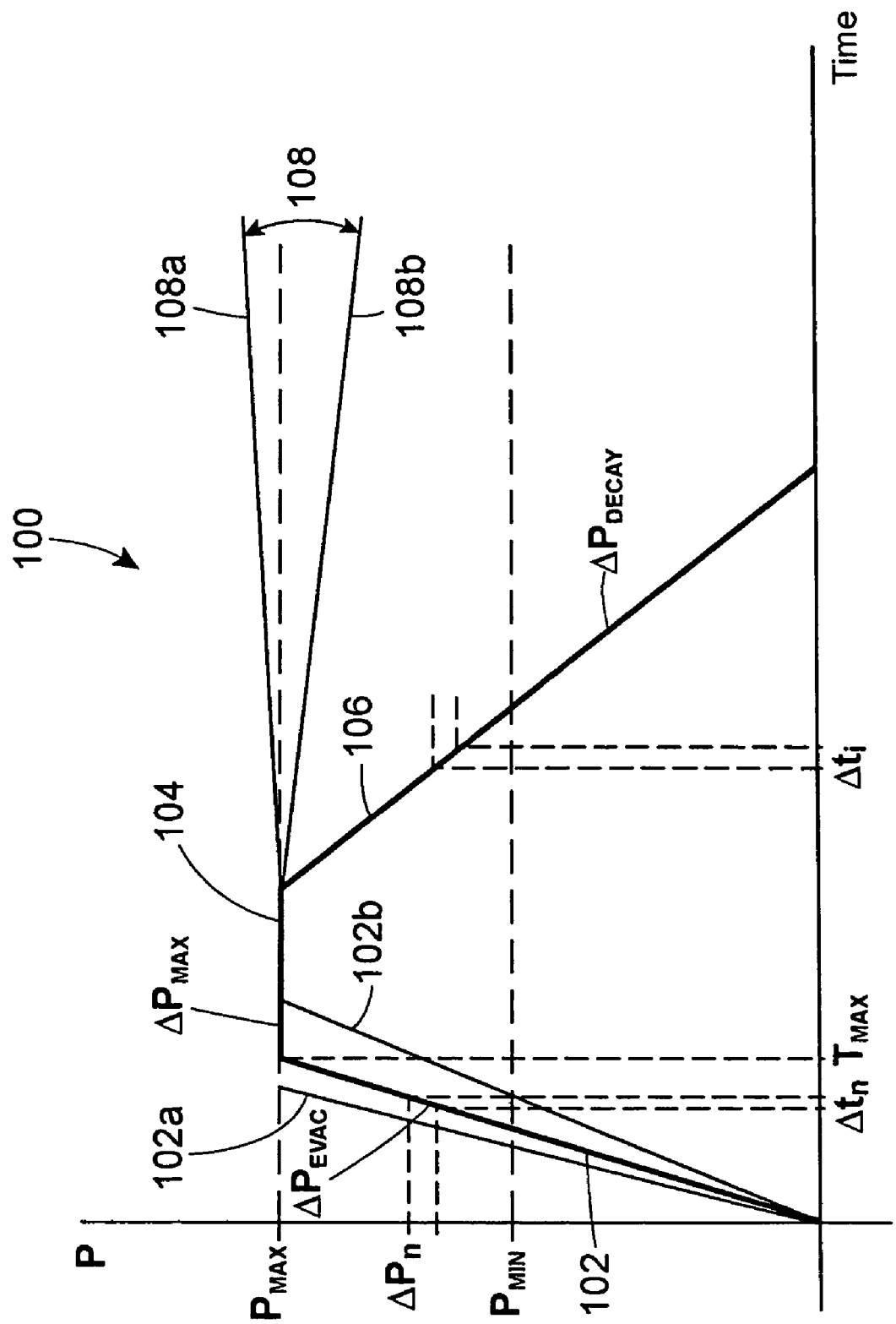
FIG. 3 illustrates an exemplary interstitial vacuum curve.

A block 64 initiates the evacuation procedure and the auto-learn routine 50 begins to learn the vacuum level data required for generation of an "up curve" (an example of which is shown in FIG. 3 as the line 102). In particular, the block 64 activates the STP 22, which, in turn, begins to evacuate the interstitial space 18 via the siphon port 28. A block 66 opens the control valve 30 to establish fluid communications between the STP 22, the interstitial space 18, and the vacuum sensor 32. Typically, the control valve 30 opens after a delay period equal to the amount of time required for the vacuum sensor 32 to detect the vacuum generated by the STP 22. It will be understood that the delay period associated with the vacuum sensor 32 may further depend on factors such as the sensitivity of the vacuum sensor 32, the vacuum capacity of the STP 22, and the overall volume of the interstitial space 18.

A block 68 causes the vacuum sensor 32 to sample and measure the current vacuum level $P_{meas}$ within the interstitial space 18 at the time interval $\Delta t$. A block 70 causes the processor 36 to set the stored vacuum level $P_{stored}$ equal to the current vacuum level $P_{meas}$, and store the resulting stored vacuum level $P_{stored}$ in the historical database established within the memory 38. At this point, the evacuation or up curve vacuum level rate of change within interstitial space 18 can be calculated based on the difference between the current vacuum level and the stored vacuum level over a fixed or known time interval. An evacuation rate of change $\Delta P_{evac}$ can be mathematically described by the formula:

$$\Delta P_{evac} = \frac{P_{meas} - P_{stored}}{\Delta t}$$

The evacuation rate of change $\Delta P_{evac}$ describes the positive or increasing slope of the evacuation curve representative of an increase in the vacuum level within the interstitial space 18. Alternatively, by plotting the current vacuum level $P_{meas}$ values, and the stored vacuum level $P_{stored}$ sampled during the operation of the auto-learn subroutine 50 as functions of time the evacuation curve can be constructed.

A block 72 compares the current vacuum level $P_{meas}$ to a maximum desired vacuum level $P_{max}$. If the current vacuum level is less than the maximum desired vacuum level, the auto-learn routine 50 enters a loop 74 and continues to sample and store the current vacuum level $P_{meas}$ until the maximum desired vacuum level is achieved. However, when the block 72 detects that the current vacuum level exceeds the maximum desired vacuum level, a block 76 closes the control valve 30.

Subsequently, a block 78 deactivates the STP 22 and the evacuation procedure concludes. At this point, the interstitial space 18 is sealed and isolated by the control valve 30, and the current vacuum level $P_{meas}$ remains substantially constant at the maximum desired vacuum level $P_{max}$.

A block 80 causes the vacuum sensor 32 to sample and measure the current vacuum level $P_{meas}$ within the sealed interstitial space 18 at each time interval $\Delta t$. The current vacuum level $P_{meas}$ is expected to remain at the maximum desired vacuum $P_{max}$ level for a fixed number of time intervals. Further, the memory 38 may store the current vacuum level $P_{meas}$, which equals the maximum desired vacuum $P_{max}$, in the memory 38 as the stored vacuum level $P_{stored}$. At this point, the vacuum level rate of change within interstitial space 18 is substantially zero. In other words, the vacuum level within the sealed interstitial space is constant. A positive or negative change in the vacuum level during this time interval represents an anomaly, such as a leak, that will trigger an alarm. A maximum vacuum rate of change $\Delta P_{max}$ can be mathematically described by the formula:

$$\Delta P_{max} = \frac{P_{meas} - P_{stored}}{\Delta t} = 0$$

The maximum vacuum rate of vacuum rate of change $\Delta P_{max}$ represents the zero-slope line corresponding to the maximum desired vacuum level $P_{max}$. It will be understood that determination of the maximum vacuum rate of change $\Delta P_{max}$ is an optional calculation that may be carried out by the control unit 34.

A block 82 initiates the decay procedure and the auto-learn routine 50 begins to learn the vacuum level data required to generate the "down" or "decay curve" (an example of which is shown in FIG. 3 as the line 106). In particular, the leak orifice valve 40 opens in response to a command issued by the control routine executing within the control unit 34. In operation, the leak orifice valve 40, which may be a manual valve that requires operator intervention to open, provides a fluid path between the current vacuum level of $P_{meas}$ within the interstitial space 18 and the zero vacuum level of the atmosphere. In other words, the leak orifice valve 40 provides an equalization path between the high vacuum level within the interstitial space 18 and the zero vacuum level of atmospheric pressure. The decrease in the current vacuum level $P_{meas}$ within the interstitial space 18 caused by the controlled leak provides a method for characterizing the performance of the secondary containment unit in the presence of an actual, uncontrolled leak.

A block 84 causes the vacuum sensor 32 to sample and measure the decreasing current vacuum level $P_{meas}$ within the interstitial space 18 at each of the time intervals $\Delta t$. A block 86 instructs the processor 36 to store the decreasing current vacuum level $P_{meas}$ in the memory 38 as the stored vacuum level $P_{stored}$. At this point, the decay or down curve vacuum level rate of change within interstitial space 18 can be calculated based on the difference between the stored vacuum level $P_{stored}$ and the current vacuum level $P_{meas}$ over a fixed time interval $\Delta t$. A decay rate of change $\Delta P_{decay}$ can be mathematically described by the formula:

$$\Delta P_{decay} = \frac{P_{stored} - P_{meas}}{\Delta t}$$

The decay rate of change $\Delta P_{decay}$ represents the negative slope of the decay curve, which is the line defined by the decreasing current vacuum level $P_{meas}$ values measured by the vacuum sensor 32 during the decay procedure of the auto-learn routine 50.

A block 88 compares the current vacuum level $P_{meas}$ to a minimum desired vacuum level $P_{min}$. It will be understood that the minimum desired vacuum level $P_{min}$ could be set to zero vacuum (i.e. atmospheric pressure) but will typically be set higher to reduce the overall setup time for the system. In other words, the closer to atmospheric pressure that the mimmum desired vacuum level $P_{min}$ is set, the longer the interstitial space 18 takes to equalize. If the current vacuum level $P_{meas}$ is greater than the minimum desired vacuum level $P_{min}$, the auto-learn routine 50 enters a loop 90 and continues to sample and store the current vacuum level $P_{meas}$ until the vacuum sensor 32 detects the minimum desired vacuum level $P_{min}$ within the interstitial space 18. However, if, at the block 88, the current vacuum level $P_{meas}$ is less than the minimum desired vacuum level $P_{min}$, a block 92 cause the control valve 30 to close. At this point, the decay procedure of the auto-learn routine 50 concludes and the learned rates of change $\Delta P_{evac}$ and $\Delta P_{decay}$ can be combined to produce the overall vacuum characteristics curve shown in FIG. 3.

FIG. 3 illustrates an exemplary overall vacuum characteristic curve 100 embodying the learned rates of change $\Delta P_{evac}$, $\Delta P_{decay}$, and the optionally derived $\Delta P_{max}$, measured and derived by the operation of the auto-calibrating routine 50. As previously indicated, the line 102 represents the learned evacuation rate of change $\Delta P_{evac}$ derived during the auto-learn routine 50 and, in particular, illustrates a positive increase the in vacuum level of the interstitial space 18 as a function of time. In physical terms, the line 102 represents the sealed interstitial space 18 fluidly connected, via the control valve 30, to the active STP 22. A maximum time $T_{max}$ represents the amount of time required for the STP 22 to increase the current vacuum level within the interstitial space 18 to the maximum desired vacuum level $P_{max}$.

An upper range defined by the line 102a and a lower range defined by the line 102b establish the allowable amount of vacuum level variation from the learned line 102 during the evacuation procedure. An alarm subroutine can activate when the current vacuum level $P_{meas}$ deviates beyond the acceptable limits established by the upper and lower ranges defined by the lines 102a and 102b. For example, the alarm subroutine may determine a leak exists within the interstitial space 18 when the current vacuum level is determined to be outside of the upper and lower ranges defined by the lines 102a and 102b, or the maximum desired vacuum $P_{max}$ is not achieved by the time $T_{max}$.

A line 104 represents the maximum desired vacuum level $P_{max}$ and the learned maximum vacuum rate of change $\Delta P_{max}$ equal to zero (i.e., the vacuum is constant). In physical terms, the line 104 represents the constant current vacuum level measured when within the interstitial space 18 is sealed and isolated from the STP 22, and the leak orifice valve 40. The isolated interstitial space 18 insures that the current vacuum level $P_{meas}$ remains virtually constant at $P_{max}$ over the fixed number of time intervals.

As described previously, the line 106 represents the learned decay rate of change $\Delta P_{decay}$ derived during the auto-learn routine 50. The line 106 illustrates a decrease in the measured vacuum level within the interstitial space 18 as a function of time. In particular, the line 106 corresponds to a system configuration wherein a controlled leak has been introduced into the underground storage system 10, and the current vacuum level $P_{meas}$ decreases as the vacuum within the interstitial space 18 equalizes with atmospheric pressure (i.e., a vacuum level of zero.)

As illustrated in FIG. 3, a permeation range 108 is defined by an upper line 108a and a lower line 108b sloping away from the line 106. The permeation range 108 represents the exemplary vacuum profile for the sealed interstitial space 18 as a function of time. In other words, during normal operations (e.g., steady state operations with no leaks or other variations) the current vacuum level $P_{meas}$ is expected to be measured within the permeation range 108 defined by lines 108a and 108b. The steady vacuum decay represented by the permeation range 108 is attributable to the natural permeation properties of the underground storage system 10, rather than to a leak or other anomaly. However, if the current vacuum level $P_{meas}$ or current vacuum level rate of change $\Delta P_{current}$ deviates from the range defined by the lines 108a and 108b, (i.e., falls outside of the permeation range 108), then a leak or other anomaly is assumed to exist within the interstitial space 18 and the alarm subroutine may activate.

However, if the current vacuum level $P_{meas}$ or current vacuum level rate of change $\Delta P_{current}$ deviates from the range defined by the lines 108a and 108b, (i.e., falls outside of the permeation range 108), than a leak or other anomaly is assumed to exist within the interstitial space 18 and the alarm subroutine may activate.

Figure 4:
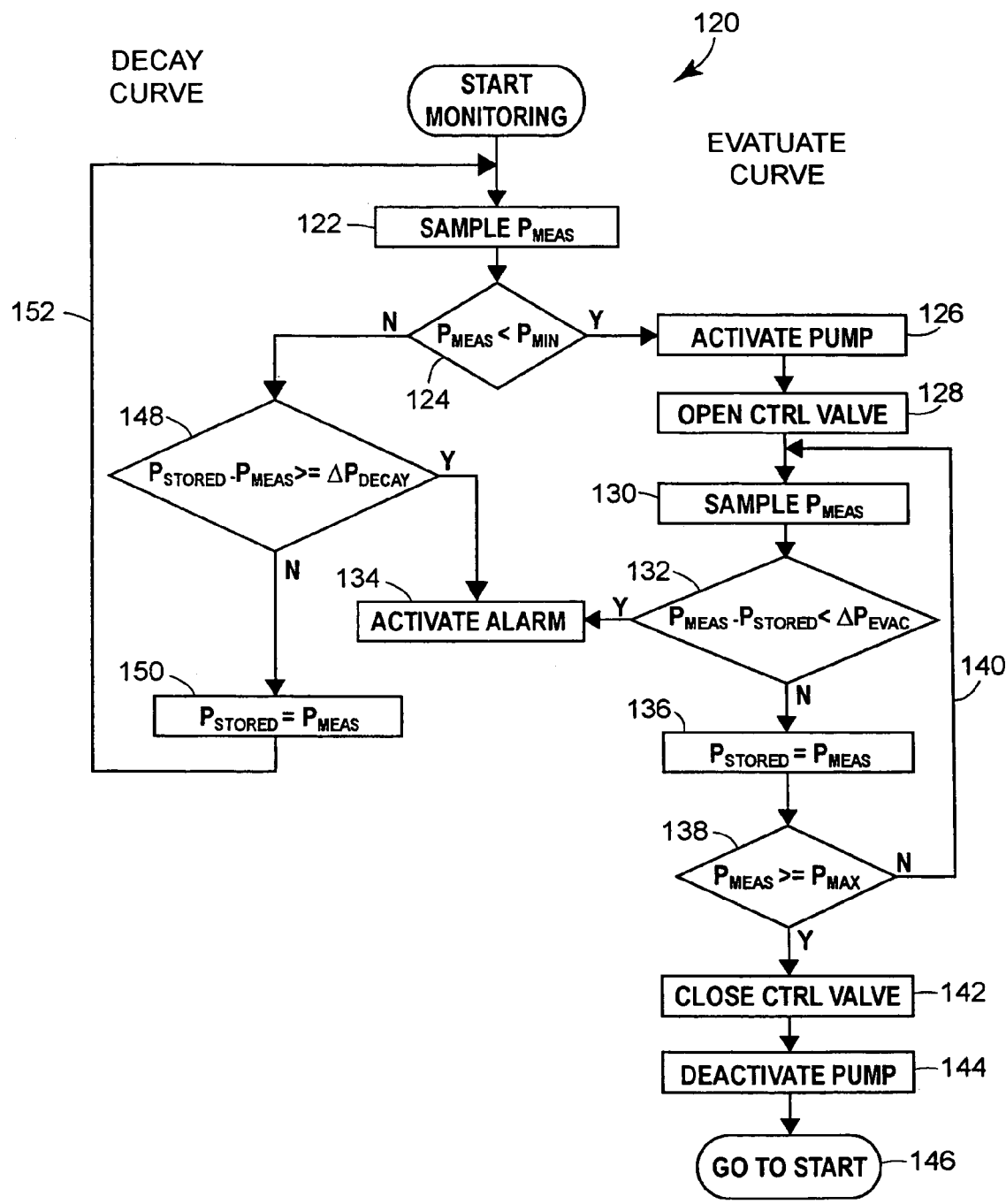
FIG. 4 illustrates a flowchart detailing the operation of an exemplary monitoring routine.

FIG. 4 illustrates a flowchart detailing the operation of an exemplary monitoring routine 120 employing the overall vacuum characteristic curve 100. A block 122 causes the vacuum sensor 32 to sample and measure the current vacuum level $P_{meas}$ within the interstitial space 18. A block 124 compares the current vacuum level $P_{meas}$ to the minimum allowable vacuum level $P_{min}$ (e.g., 2 in. Hg or zero vacuum). If the current vacuum level $P_{meas}$ is below minimum allowable vacuum level $P_{min}$, a block 126 activates the STP 22 which, in turn, begins to evacuate the interstitial space 18 as generally indicated by the evacuation curve 102 illustrated in FIG. 3.

A block 128 causes the control valve 30 to open, thereby establishing fluid communication between the STP 22, the interstitial space 18, and the vacuum sensor 32. Typically, the control valve 30 opens after a delay period equal to the amount of time required for vacuum sensor 32 to detect the vacuum generated by the STP 22. A block 130 instructs the vacuum sensor 32 to sample and measure the increasing current vacuum level $P_{meas}$ within the interstitial space 18 at each of the time intervals $\Delta t$.

A block 132 compares a current vacuum level rate of change $P_{current}$ to the learned evacuation rate of change $\Delta P_{evac}$ determined during the auto-learn routine 50. It will be understood that the current vacuum level rate of change $\Delta P_{current}$ can be determined based on the difference between the current vacuum level $P_{meas}$ and the stored vacuum levels $P_{stored}$ as a function of time. A current vacuum level rate of change $\Delta P_{current}$ can be described by the formula:

$$\Delta P_{current} = \frac{P_{meas} - P_{stored}}{\Delta t}$$

If the current vacuum level rate of change $\Delta P_{current}$ is determined to be less than the learned evacuation rate of change $\Delta P_{evac}$, a block 134 may activate the alarm routine. However, if the current vacuum level rate of change $\Delta P_{current}$ exceeds the learned evacuation rate of change $\Delta P_{evac}$, a block 136 instructs the processor 36 to store the increasing current vacuum level $P_{meas}$ in the memory 38 as the stored vacuum level $P_{stored}$.

A block 138 compares the current vacuum level $P_{meas}$ to a maximum desired vacuum level $P_{max}$. If the current vacuum level $P_{meas}$ is less than the maximum desired vacuum level $P_{max}$, the monitoring routine 120 enters a loop 140 and continues to sample and store the current vacuum level $P_{meas}$ until the maximum desired vacuum level $P_{max}$ is detected. However, if the current vacuum level $P_{meas}$ exceeds the maximum desired vacuum level $P_{max}$, a block 142 causes the control valve 30 to close.

A block 144 deactivates the STP 22 upon completion of the evacuation of the now-sealed interstitial space 18. Thus, the monitoring routine 120 has recharged the vacuum level within the interstitial space 18. In operation, the evacuation or increase in the vacuum level of the interstitial space 18 proceeds along the learned evacuation vacuum curve 102, and the monitoring routine 120 continually verifies that the current vacuum level $P_{meas}$ remains within the predefined range defined by the lines 102a and 102b. Simultaneously, the time required to recharge the interstitial space 18 to the maximum desired vacuum level $P_{max}$ can be compared to the maximum time $T_{max}$. If the current recharge time exceeds the maximum time $T_{max}$, a leak or other anomaly is assumed to exist and the alarm routine 134 activates.

A block 146 restarts the monitoring routine 120 so that the vacuum sensor 32 samples and measures the current vacuum level $P_{meas}$ at the block 122. At the block 124, the recently recharged current vacuum level $P_{meas}$ is compared to the minimum allowable vacuum level $P_{min}$ (e.g., 2 in. Hg or zero vacuum). Because the recently recharged current vacuum level $P_{meas}$ is greater than the minimum allowable vacuum level $P_{min}$, a block 148 compares the current vacuum level rate of change $P_{current}$ to the learned decay rate of change $\Delta P_{decay}$ determined during the auto-learn routine 50.

As previously discussed, the interstitial space 18 is sealed and the monitoring routine 120 measures the current vacuum level $P_{meas}$ to determine if the decrease in the current vacuum level $P_{meas}$ is attributable to the natural permeation properties of the underground storage system 10 or to a leak. Furthermore, the comparison between the learned vacuum curve and the current vacuum level $P_{meas}$ can be based on the difference between the decay rate of change $\Delta P_{decay}$ and the current rate of change $\Delta P_{current}$ or simply based on the difference between the current vacuum level $P_{meas}$ and the learned vacuum curve itself.

A block 150 instructs the processor 36 to store the current vacuum level $P_{meas}$ in the memory 38 as the stored vacuum level $P_{stored}$. At this point, the monitoring routine 120 enters a loop 152 and continues to sample and store the current vacuum level $P_{meas}$ until the minimum allowable vacuum level $P_{min}$ is detected, at which time the STP 22 activates to evacuate the interstitial space 18.

While the embodiments described herein have been directed to vacuum level measurements and analysis, it will be understood that an overpressure within the interstitial space 18 may be employed to provide a pressure gradient suitable for measurement by the auto-learn routine 50 and monitoring by the monitoring routine 120. Further, it will be understood that the current vacuum level $P_{meas}$ and the calculated rates of change can be determined in a manual fashion. For instance, manual instructions may direct the control unit 34 to sample and store the current vacuum level $P_{meas}$ within the interstitial space 18. Moreover, an operator may employ the rate of change formulas and concepts discussed above in conjunction with the stored vacuum levels $P_{stored}$ to manually calculate the desired rates of change.

Although certain embodiments have been described in accordance with the teachings of the present disclosure, the scope and coverage of this patent is not limited thereto. To the contrary, this patent is intended to cover all embodiments of the teachings of the disclosure that fairly fall within the scope of the permissible equivalents.

What is claimed is:

1. An underground storage system comprising:
 a primary containment unit;
 a secondary containment unit arranged to sealingly encompass the primary containment unit;
 a leak detection system including a controlled leak, wherein the leak detection system is fluidly connected to the secondary containment unit and adapted to learn the vacuum characteristics of the secondary containment unit;
 wherein the leak detection system is adapted to detect fluid leaks in the primary containment system and the secondary containment unit;
 wherein the secondary containment unit is fluidly connected to a leak orifice valve adapted to create the controlled leak within the secondary containment unit; and
 wherein the leak orifice valve is removably connected to the secondary containment unit.

2. The underground storage system of claim 1, wherein the secondary containment unit is fluidly connected to a vacuum pump adapted to evacuate the secondary containment unit.

3. The underground storage system of claim 2, wherein the secondary containment unit is fluidly connected to a vacuum sensor adapted measure a vacuum characteristic within the secondary containment unit.

4. The underground storage system of claim 3, wherein the vacuum sensor is a sensor selected from the group consisting of a continuous analog sensor, a discrete digital sensor, and a switch based sensor.

5. The underground storage system of claim 1, wherein the leak detection system is a vacuum detection system.

6. An underground storage system comprising:
 a primary containment unit;
 a secondary containment unit arranged to sealingly encompass the primary containment unit;
 a leak detection system including a controlled leak, wherein the leak detection system is fluidly connected to the secondary containment unit and adapted to learn the vacuum characteristics of the secondary containment unit;
 wherein the leak detection system is adapted to detect fluid leaks in the primary containment system and the secondary containment system unit;
 wherein the leak detection system further comprises a control unit including a memory that stores an auto-calibration routine and a processor adapted to execute the auto-calibration routine; and
 wherein the auto-calibration routine learns at least one vacuum characteristic of the secondary containment unit without requiring information describing a volume of the secondary containment unit.

7. The underground storage system of claim 6, wherein the at least one vacuum characteristic is a vacuum level rate of change.

8. The underground storage system of claim 6, wherein the leak detection system further comprises a leak orifice valve arranged to create a controlled leak within the secondary containment unit.

9. An underground storage system including a secondary containment unit fluidly connected to a vacuum pump and to a vacuum sensor, the underground storage system comprising:
 a leak orifice valve fluidly connected to the secondary containment unit and the vacuum sensor, the leak orifice valve adapted to provide a controlled leak when in an open position; and
 a control unit communicatively connected to the vacuum sensor and adapted to receive a vacuum output signal, wherein the control unit includes a memory to store an auto-calibration routine and a processor adapted to execute the auto-calibration routine based on the vacuum output signal and a time interval determined by the processor.

10. The underground storage system of claim 9 further comprising a control valve adapted to fluidly isolate the secondary containment unit.

11. The underground storage system of claim 9, wherein the leak orifice valve is a manual valve.

12. The underground storage system of claim 9, wherein the controlled leak is a fluid path between the secondary containment unit and a zero vacuum source.

13. The underground storage system of claim 9, wherein the control unit activates the auto-calibration routine based on a first vacuum event.

14. The underground storage system of claim 13, wherein the control unit deactivates the auto-calibration routine based on a second vacuum event.

15. The underground storage system of claim 9, wherein the auto-calibration routine is adapted to develop a vacuum curve describing at least one vacuum characteristic of the secondary containment unit.

16. The underground storage system of claim 9, wherein the control unit further includes a continuous monitoring routine adapted to be executed on the processor.

17. The underground storage system of claim 16, wherein the control unit activates the continuous monitoring routine based on a third vacuum event.

18. A method of generating a vacuum curve representative of at least one vacuum characteristic of an interstitial space, the method comprising:
   generating a vacuum within the interstitial space in response to a first vacuum event;
   determining a first vacuum level rate of change within the interstitial space;
   creating a controlled leak within the interstitial space in response to a second vacuum event; and
   determining a second vacuum level rate of change within the interstitial space.

19. The method of claim 18, wherein generating a vacuum further includes activating a vacuum pump fluidly connected to the interstitial space.

20. The method of claim 19, wherein generating a vacuum further includes opening a control valve to provide a fluid connection between the vacuum pump and the interstitial space.

21. The method of claim 18, wherein generating a vacuum further includes generating the vacuum in response to detecting the first vacuum level below a minimum vacuum level.

22. The method of claim 18, wherein determining a first vacuum level rate of change further includes measuring an interstitial vacuum level over a time interval.

23. The method of claim 22, wherein determining a first vacuum level rate of change further includes continuously measuring an interstitial vacuum level at a regular time interval.

24. The method of claim 18, wherein creating a controlled leak further includes opening a leak valve.

25. The method of claim 24, wherein opening a leak valve occurs when the second vacuum event is equal to maximum vacuum level.

26. An underground storage system including a primary containment unit and a secondary containment unit arranged to sealingly encompass the primary containment unit, the underground storage system comprising:
   a leak detection system including a leak orifice for generating a controlled leak, wherein the leak detection system is fluidly connected to the secondary containment unit and is adapted to sample a pressure differential within the secondary containment unit to learn a pressure characteristic of the secondary containment unit; and
   wherein the leak detection system is adapted to detect fluid leaks in the primary containment unit and the secondary containment unit,
   wherein the leak detection system further comprises:
   a control unit including a memory to store an auto-calibration routine and a processor adapted to execute the auto-calibration routine;
   wherein the auto-calibration routine learns at least one pressure characteristic of the secondary containment unit without requiring information describing a volume of the secondary containment system.

27. The underground storage system of claim 26, wherein the secondary containment unit is fluidly connected to a pump.

28. The underground storage system of claim 27, wherein the pump is adapted to pressurize the secondary containment unit.

29. The underground storage system of claim 27, wherein the pump is adapted to evacuate the secondary containment unit.

30. The underground storage system of claim 26, wherein the secondary containment unit is fluidly connected to a leak orifice valve adapted to create the controlled leak within the secondary containment unit.

31. The underground storage system of claim 26, wherein the secondary containment unit is fluidly connected to a sensor adapted to measure the pressure differential within the secondary containment unit.

32. The underground storage system of claim 31, wherein the sensor is a sensor selected from the group consisting of a continuous analog sensor, a discrete digital sensor, and a switch based sensor.

33. The underground storage system of claim 26, wherein the leak detection system further comprises a leak orifice valve arranged to create a controlled leak within the secondary containment unit.

* * * * *

UNITED STATES PATENT AND TRADEMARK OFFICE
CERTIFICATE OF CORRECTION

| | | |
|---|---|---|
| PATENT NO. | : 7,051,579 B2 | |
| APPLICATION NO. | : 10/842894 | |
| DATED | : May 30, 2006 | |
| INVENTOR(S) | : Donald P. Kenney et al. | |

It is certified that error appears in the above-identified patent and that said Letters Patent is hereby corrected as shown below:

In the Claims:

At Column 10, line 41, "system" should be -- unit --.

At Column 12, line 29, "system" should be -- unit --.

Signed and Sealed this

First Day of May, 2007

JON W. DUDAS
*Director of the United States Patent and Trademark Office*